United States Patent
Park

(10) Patent No.: US 9,301,121 B2
(45) Date of Patent: Mar. 29, 2016

(54) PEER TO PEER MULTIPLE IDENTIFIERS

(75) Inventor: Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 12/163,043

(22) Filed: Jun. 27, 2008

(65) Prior Publication Data
US 2009/0016255 A1 Jan. 15, 2009

Related U.S. Application Data

(60) Provisional application No. 60/949,165, filed on Jul. 11, 2007.

(51) Int. Cl.
*H04W 8/00* (2009.01)
*H04W 8/26* (2009.01)
*H04W 84/18* (2009.01)

(52) U.S. Cl.
CPC ............... *H04W 8/005* (2013.01); *H04W 8/26* (2013.01); *H04W 84/18* (2013.01)

(58) Field of Classification Search
CPC ............ H04L 29/06585; H04L 9/3223; H04L 29/08234; H04L 45/7453; H04L 45/74; H04W 8/005
USPC ......................................................... 370/475
See application file for complete search history.

(56) References Cited

U.S. PATENT DOCUMENTS

| | | | |
|---|---|---|---|
| 2003/0005036 A1* | 1/2003 | Mitzenmacher | 709/203 |
| 2003/0225912 A1 | 12/2003 | Takeda et al. | |
| 2004/0037297 A1* | 2/2004 | Ishida et al. | 370/395.54 |
| 2005/0266798 A1* | 12/2005 | Moloney et al. | 455/41.2 |
| 2007/0141988 A1 | 6/2007 | Kuehnel et al. | |
| 2007/0167187 A1* | 7/2007 | Rezvani et al. | 455/550.1 |
| 2008/0013556 A1* | 1/2008 | Kaippallimalil | 370/401 |

FOREIGN PATENT DOCUMENTS

| | | |
|---|---|---|
| JP | 2006352806 A | 12/2006 |
| WO | WO2007075961 A2 | 7/2007 |

OTHER PUBLICATIONS

Pars Mutaf and Claude Castelluccia, "Compact neighbor discovery (A bandwidth defense through bandwidth optimization)" Mar. 2005, IEEE, 4th Annual Joint Conference of the IEEE Computer and Co Mmunications Societies. Proceedings IEEE Miami, FL, USA Mar. 13-17, 2005, Piscataway, NJ, USA, I EEE, vol. 4,, pp. 2711-2719.*

(Continued)

*Primary Examiner* — Omer S Mian
(74) *Attorney, Agent, or Firm* — James K. O'Hare

(57) ABSTRACT

In an ad hoc peer-to-peer type network during peer discovery, information relating to an identifier associated with users of various devices is broadcast to other devices in an efficient manner. Two or more identifiers can be processed to produce a single value (e.g., bit vector) that is transmitted for the purpose of peer discovery, thus mitigating the need to broadcast the two or more identifiers separately. A public identifier can be converted to a private temporary identifier and the private temporary identifier can be used as one of the inputs to the operation producing the single value to be transmitted. The aspects are not limited to peer discovery and can include broadcasting by inanimate objects or broadcasting of services, functions or interests.

20 Claims, 12 Drawing Sheets

(56) References Cited

OTHER PUBLICATIONS

Mutaf, P. et al: "Compact Neighbor Discovery (A Bandwidth Defense Through Bandwidth Optimization)," Infocom 2005. 24th Annual Joint Conference of the IEEE Computer and Communications Societies. Proceedings IEEE, Miami, FL, US, Mar. 13-17, 2005, Piscataway, NJ, USA, IEEE, vol. 4, Mar. 13, 2005 pp. 2711-2719, XP010829297, ISBN: 978-0-7803-8968-7.

Bloom, B.H.: "Space/Time Trade-Offs in Hash Coding with Allowable Errors," Communications of the Association for Computing Machinery, ACM, New York, NY, US, vol. 13, No. 7, Jul. 1, 1970, pp. 422-426, XP002490170, ISSN: 0001-0782.
International Search Report, PCT/US2008/069268—International Search Authority—European Patent Office—Nov. 5, 2008.
Written Opinion, PCT/US2008/069268—International Search Authority—European Patent Office—Nov. 5, 2008.
Taiwan Search Report—TW097125771—TIPO—Apr. 25, 2012.

* cited by examiner

PEER TO PEER MULTIPLE IDENTIFIERS

CROSS-REFERENCE

This application claims the benefit of U.S. Provisional Application Ser. No. 60/949,165, filed Jul. 11, 2007, entitled "PEER TO PEER MULTIPLE IDENTIFIERS," and assigned to the assignee hereof and the entirety of which is incorporated herein by reference.

BACKGROUND

I. Field

The following description relates generally to wireless communications, and more particularly to peer discovery techniques for wireless communication networks.

II. Background

Wireless communication systems or networks are widely deployed to provide various types of communication; for instance, voice and/or data may be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station, access point, or access router. The access point covers a geographic range or cell and, as the mobile device is operated, it may be moved in and out of these geographic cells.

Some networks can be constructed utilizing solely peer-to-peer communication without utilizing base stations, access points, or access routers. Such networks are sometimes referred to as ad hoc networks. Communication in such networks may, in some cases, be limited to exchanges between devices that are within direct wireless transmission range of each other, while in other cases multi-hop forwarded between non-adjacent devices may be supported. Various techniques may be used to maintain connectivity and/or forwarding information as the topology of the network changes (e.g., as devices join, leave, or move). Some networks can also be constructed utilizing a combination of both peer-to-peer as well as base stations, access points, or access routers.

In a large scale mobile wireless network, particularly a network that includes peer-to-peer communication, a device may frequently come within transmission range of other devices (e.g., the set of potential communication peers over time is large). However, the set of such other devices that a device actually has a need or a desire to communicate with may be much smaller (e.g., a smaller set of known or related communication peers). In general, the smaller set of known or related communication peers that a device has a need or a desire to communicate with is defined by higher layer information (e.g. user affiliations, administrative relationships, applications, and so forth). Each device may be known and/or associated with multiple identifiers and each identifier may only be known to a subset of explicitly related peers. Therefore, to enable all explicitly related peers to discover a particular device, all the identifiers associated with the device should be advertised (e.g., broadcast) to facilitate peer discovery.

SUMMARY

The following presents a simplified summary of one or more aspects in order to provide a basic understanding of such aspects. This summary is not an extensive overview of all contemplated aspects, and is intended to neither identify key or critical elements nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating efficient communication of information associated with a device that has two or more identifiers associated with the device user. Since the number of identifiers per device may be large and the number of the devices in a network may also be large, it is beneficial to minimize the overhead associated with advertising such information and provide efficient mechanisms for communicating and processing such information.

A recipient device that does not know all of the identifiers associated with a transmitting device can determine if one or more known identifiers have been included in a communication from the transmitting device. The two or more identifiers can be different types or combinations of known identifiers and can include one or more private temporary identifiers.

In a related aspect is a method for creating a sequence of bits (e.g., a bit vector) that represent two or more known identifiers for broadcast during peer discovery. The method comprises selecting two or more identifiers to be broadcast. The identifiers are associated with a transmitting device. The method also includes processing the selected identifiers to produce a sequence of marked bits included in a bit vector. The bit vector can be advertised or broadcast for peer discovery purposes.

Another aspect relates to a wireless communications apparatus that comprises a memory and a processor. The memory retains instructions related to choosing two or more identifiers to broadcast and processing the two or more identifiers through a filtering mechanism to produce a bit vector corresponding to the two or more identifiers. The bit vector can be transmitted to nodes within the vicinity. The processor is coupled to the memory and configured to execute the instructions retained in the memory.

Still another aspect relates to a wireless communications apparatus that broadcasts at least two identifiers using a bit vector to facilitate peer discovery and mitigate the amount of overhead in an ad hoc environment. The apparatus comprises a means for selecting at least a subset of identifiers associated with a device and a means for processing the at least a subset of identifiers to produce an output bit sequence that comprises marked bits. Also included in apparatus is a means for transmitting the output bit sequence to a multitude of receiver devices.

Another related aspect is a computer program product comprising a computer-readable medium that comprises a first set of codes for causing a computer to choose two or more identifiers to broadcast periodically for peer discovery purposes. Also included is a second set of codes for causing the computer to perform an operation (e.g. a hash or multiple hashes) on the chosen identifiers to produce a plurality of set bits within a bit vector. The plurality of set bits correspond to the two or more identifiers. Also included is a third set of codes for causing the computer to convey the bit vector with the set bits for peer discovery by other nodes within a communication environment.

Another aspect relates to at least one processor configured to create a sequence of bits that represent two or more known identifiers for broadcast during peer discovery. The processor includes a first module for selecting two or more identifiers to be transmitted during peer discovery and a second module for converting at least one of the two or more identifiers to another identifier (e.g., private identifier). Also included is a third module for setting an upper bound on a number of marked bits that can be included in a bit vector and a fourth module for processing one or more of the selected identifiers and the private temporary identifier, such as though a hash algorithm or set of hash algorithms, to produce a sequence of marked bits within the bit vector, the sequence of marked bits complies with the set upper bound. The processor further includes a fifth module for broadcasting the bit vector for peer discovery purposes.

In a related aspect is a method for receiving and decoding marked bits included in a bit vector for peer discovery purposes. The method comprises determining bits in a bit vector that should be marked if a peer node is broadcasting a known identifier. At least a subset of a bit vector is received from a node in a communication network. The method also includes evaluating the received at least a subset of a bit vector and ascertaining if the received at least a subset of the bit vector could be from the peer node. Communication can be selectively initiated if the bit vector could be from the peer node.

Another aspect relates to a wireless communications apparatus that comprises a memory and a processor. The memory retains instructions related to receiving a bit vector from a transmitting node and decoding the bit vector. The memory further retains instructions related to determining which bits should be set if the bit vector is likely from a related peer and verifying whether the transmitting node is the related peer. The processor is coupled to the memory and is configured to execute the instructions retained in the memory.

Still another aspect relates to a wireless communications apparatus that receives and interprets a sub-portion of a bit vector to facilitate peer discovery in an ad hoc environment. The apparatus comprises a means for receiving at least a portion of a bit vector from a transmitting node and a means for determining which bits in the received portion of the bit vector are marked. Also included in apparatus is a means for deciding which bits a peer node would mark in the bit vector and a means for ascertaining if the portion of the bit vector might be from the peer node based on the determination of the bits marked in the received portion of the bit vector.

Another aspect relates to a computer program product comprising a computer-readable medium comprising a first set of codes for causing a computer to decide a sequence of bits that should be set to "1" if a peer node is transmitting a bit vector. Also included is a second set of codes for causing the computer to receive at least a subset of a bit vector from a node in an ad hoc network. Also included is a third set of codes for causing the computer to ascertain if the at least a subset of the bit vector might be from the peer node based on the bits set to "1" in the received bit vector. A fourth set of codes for causing the computer to selectively request confirmation if the peer node is the node from which the subset of the bit vector was received is also included.

A further aspect relates to at least one processor configured to receive and decode marked bits included in a bit vector for peer discovery purposes. Included in processor is a first module for receiving from a transmitting node a bit vector that includes a plurality of bits and a second module for disregarding the bit vector if a number of bits from the plurality of bits exceeds an upper limit. The processor can further include a third module for determining which bits in the plurality of bits should be set if the bit vector is from a related peer and a fourth module for comparing the set bits in the received bit vector with the bits that should be set if from the related peer. Also included is a fifth module for sending a communication to the peer to determine whether the transmitting node is the related peer if the comparison indicates the received bit vector could have been received from the related peer.

To the accomplishment of the foregoing and related ends, the one or more aspects comprise the features hereinafter fully described and particularly pointed out in the claims. The following description and the annexed drawings set forth in detail certain illustrative examples of the one or more aspects. These examples are indicative, however, of but a few of the various ways in which the principles of various aspects may be employed and the described examples are intended to include all such aspects and their equivalents.

DETAILED DESCRIPTION

Figure 1:
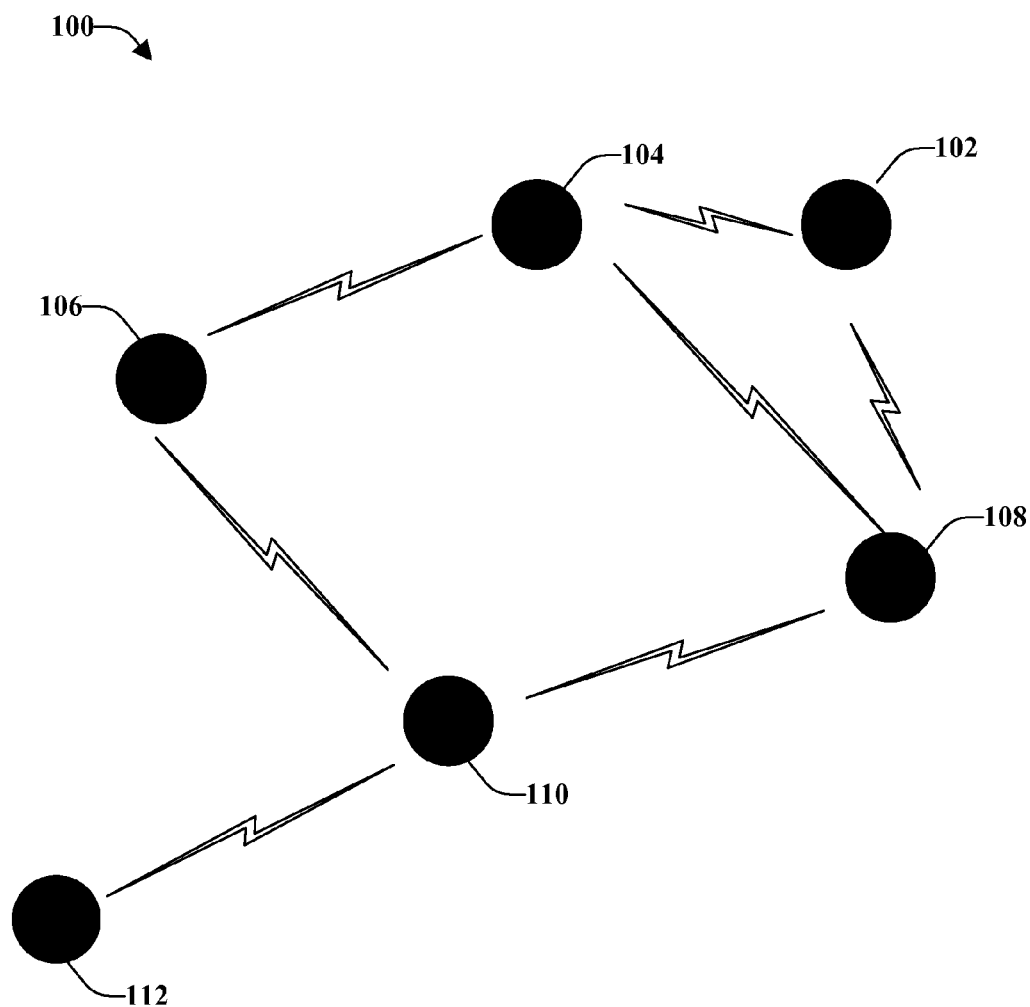
FIG. 1 illustrates a wireless communication network in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication network 100 is illustrated in accordance with various aspects presented herein. Network 100 can be an ad hoc wireless communication network and can support peer-to-peer communications. During peer-to-peer communication, nodes, devices, terminals or stations may communicate directly with each other, as opposed to using base stations and/or access points to relay or forward communications. In some such networks, devices within the network can relay or forward traffic destined to other devices. Some ad hoc networks can include both terminals and access points.

Network 100 can include any number of mobile devices or nodes, of which six are illustrated, that support wireless communication. Mobile devices can be, for example, cellular phones, smart phones, laptops, handheld communication devices, handheld computing devices, satellite radios, global positioning systems, PDAs, and/or any other suitable device for communicating over wireless communication system 100. Nodes, as used herein, include mobile devices, access points, base stations, access routers, or the like.

Nodes 102, 104, 106, 108, 110, and 112 are illustrated as configured in a peer-to-peer ad hoc topology. Each node can be within range of one or more other nodes and can communicate with the other nodes or through utilization of the other nodes, such as in a multi-hop topology (e.g., communications can hop from node to node until reaching a final destination). For example, a sender node 102 may wish to communicate with a receiver node 112. To enable packet transfer between sender node 102 and receiver node 112, one or more intermediate nodes 104, 106, 108, and/or 110 can be utilized. It should be understood that any node 102-112 can be a sender node and/or a receiver node and can perform functions of either sending or receiving information at substantially the same time (e.g., can broadcast or communicate information at about the same time as receiving information). It should also be understood that any node 102-112 could also provide access to other communication infrastructures (not shown), such as a wired network for example, and in some such cases may function similar to an access point.

Periodically or based on other criteria (e.g., a request), a node (referred to herein as sending node or sending device) can broadcast or announce its presence to other nodes within its range, which can be utilized during peer discovery. Nodes that receive the presence information (referred to herein as receiving nodes or receiving devices) are aware of the existence of the sending node based on the information received. Such nodes can determine whether to establish communication with the sending node based on the received information. It should be understood that although nodes within the communication network 100 might not be able to distinguish the other nodes within the communication network (e.g. know the user, service, function, interest, etc. associated with a particular node), the presence (or existence) of the other nodes is known. Thus, if there are conversations occurring, the conversations can be coordinated to take into account various factors including bandwidth capabilities, interference mitigation and other concerns.

Information announced during peer discovery can include information relating to the user of the node or device (e.g., sending device), an application executing on the sending node or device, a service provided by the sending node or device, and so forth. At any given time, there may be one or more identifiers associated with a particular device that can be advertised (e.g. broadcast) as part of peer discovery. For example, an individual might have a first identifier associated with the individual's work (e.g., myname@company.com), a second identifier associated with a home or personal network (e.g., myalias@provider.net), a third identifier associated with a club (e.g., mynickname@myclub.org) and the individual might also have further identifiers associated with a school or university, an interest, or other identifiers. Various persons (e.g., family members, coworkers, friends, peers, associates, and so forth) might know the individual by one or more identifiers, but not necessarily all of the identifiers associated with the individual. While it is possible to advertise all of the node's identifiers for the purpose of peer discovery, advertising each of the identifiers individually can result in significant overhead (e.g. due to inefficient use of communication resources). In accordance with the various aspects disclosed herein, multiple identifiers can be combined in a manner such that information relating to the multiple identifiers can be conveyed (e.g. broadcast) in a more efficient manner, while still allowing a receiver with knowledge of only a subset of the identifiers to detect inclusion of any known identifiers in a received advertisement (e.g., peer discovery) of the combined identifiers.

For example, the set of identifiers by which a node in a peer-to-peer network is known can be used as inputs (e.g., the elements or keys) to a mechanism (e.g., a Bloom filter) that can perform a hash function or a multitude of different hash functions to produce a hash value(s). A resulting bit vector that can include a string of bits, which can be set to "0" or "1", can be conveyed, such as through a periodic broadcast, to other nodes in the peer-to-peer network. Upon receiving a bit vector conveyed from another node in the peer-to-peer network, a receiving node can determine whether any known identifiers of related peers may have been used as input to the mechanism (e.g., bloom filter) resulting in the received bit vector. If so, communications can be initiated with the sending node to verify if it is the related peer (e.g., a request for confirmation and/or authentication).

It should be understood that while the disclosed aspects are shown and described relating to advertising a bit vector (e.g., via broadcast), other manners of advertising a combination of the identifiers can be utilized. Examples of such advertising can include, but are not limited to, encoded in frequency, encoded in time, and so forth. The various aspects can be advertised (e.g., broadcast) in any manner and can be applicable to a variety of technology types. Additionally or alternatively, the disclosed aspects can be used in a variety of contexts, such as instant messaging or chat services.

Figure 2:
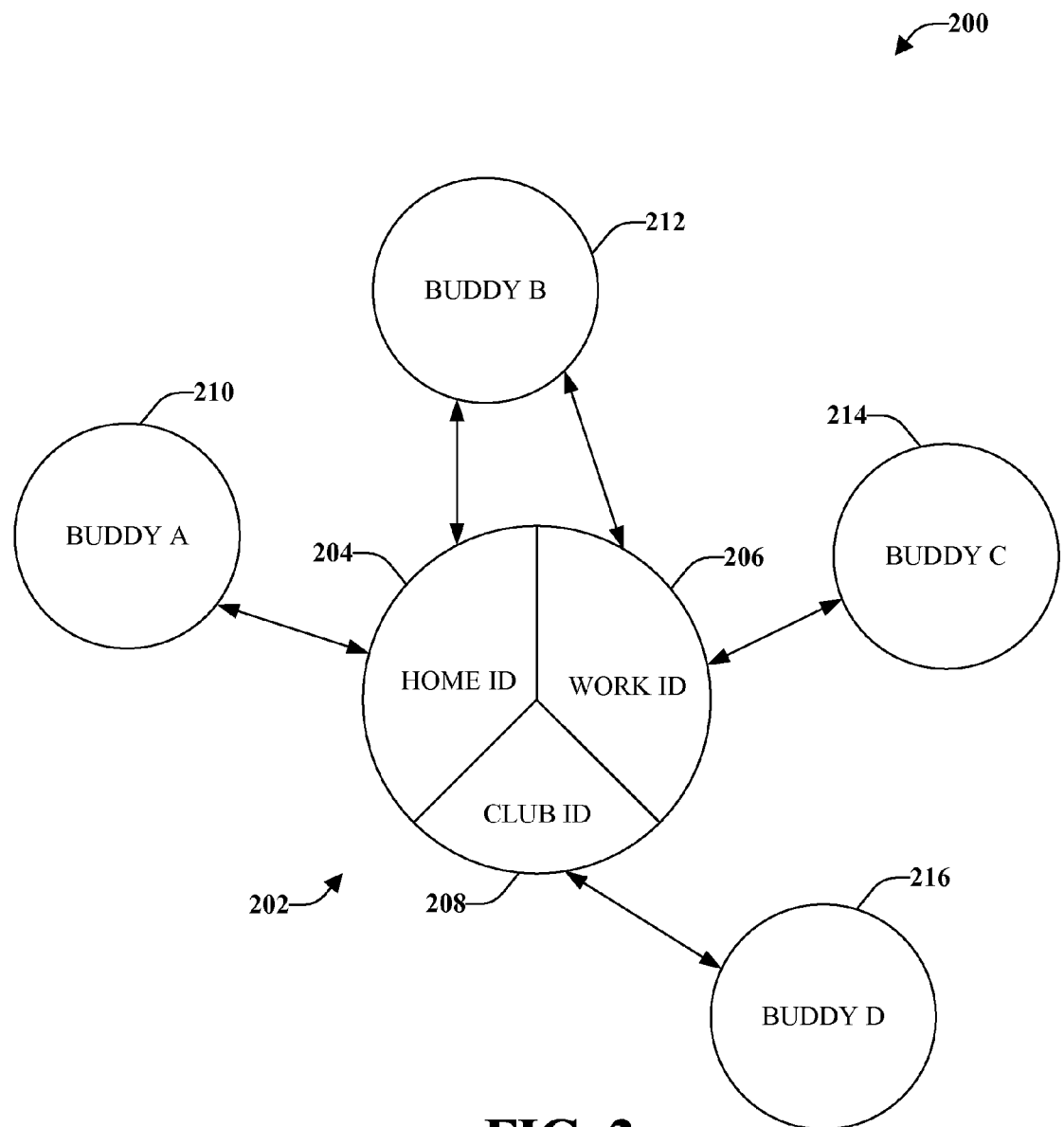
FIG. 2 illustrates a peer relationship for a node with multiple identifiers in accordance with the disclosed aspects.

FIG. 2 illustrates a peer relationship 200 for a node with multiple identifiers in accordance with the disclosed aspects. A node (or corresponding user) 202 can be known by multiple identifiers (IDs), such as a Home ID 204, a Work ID 206, and a Club ID 208. Each ID 204, 206, 208 might be known to (and/or used for communication with) a different subset of other nodes (or corresponding users). As illustrated, node 202 is known by only the Home ID 204 to Buddy "A" 210, by both the Home ID 204 and the Work ID 206 to Buddy "B" 212, by only the Work ID 206 to Buddy "C" 214, and by only the Club ID 208 to Buddy "D" 216.

Although it may be possible for node 202 to advertise all of its known identifiers 204, 206, 208 for the purpose of peer discovery, the use of a combining mechanism, such as a Bloom filter or another type of filter, as part of the discovery process and/or mechanisms can mitigate the need for broadcasting each identifier individually.

The various aspects shown and described herein are related to people communicating though respective nodes. It should be understood that the aspects are not so limited and can apply to inanimate objects, applications, processes, services, functions, interests, or other types of items that can be advertised. For example, a user, though a device, might want to discover nearby banking machines (e.g., ATM machines) that provide cash services. The banking machines can advertise respective identifiers that advertise such machines as banking machines. The user can selectively change discovery of ATM machines to something else (e.g., printers, telephone, vending machine, and so forth). Searching for such inanimate objects or services can be based on a designated namespace so that the searching device knows which identifier to search for (e.g., ATM@universalnamespace.com). The service or inanimate object might provide multiple services and, therefore, has a separate identifier for each service or function. The disclosed aspects can be utilized so that multiple identifiers can be broadcast in an efficient manner. There should be some commonality in the name space (e.g., registry of known services, functions, and names that can be advertised). Users can selectively choose which identifier to advertise and/or which identifiers are desired to be received (e.g., set to "1", marked, turned on). It should also be understood that a device can advertise a combination of identifiers of differing types. For example, a device operated by a user and simultaneously providing some application layer service (e.g., gaming server), can advertise a combination of a user identifier and a service identifier.

In accordance with some aspects, the identifiers broadcast as set bits in a bit vector can be associated with an application and/or mode of operation. An individual might be looking for others that want to play a particular game (e.g., poker). The individual can advertise utilizing a mobile device and a known identifier that indicates the individual would like to find others with which to play a game. In another example, an identifier can be used to advertise that a person is single and looking for a date or for other people that have similar interests (e.g. concert, restaurant, book discussion) that would like to communicate, meet, or spend time together. Those individuals looking for others having similar interests can be listening (with respective devices) for a broadcast that includes a subset of bits in a bit vector that are set to "1". Another example of services or functions that can be advertised is access to the Internet (e.g., Internet attachment point). There can be a multitude of services and functions that can be advertised using the disclosed aspects and can be tangible, communication related, application related (e.g., game), and so forth.

For example purposes and not limitation, the bit vector can be of some predetermined length (e.g., 64-bit vector) and can be of sufficient length to mitigate the probability of false positives by specifying a maximum number of bits (e.g., 24) that can be set to "1" in a valid bit vector. In this case, each identifier included in computation of the bit vector could set up to a predetermined number of bits (e.g., 8), enabling the combination of at least three identifiers. Thus, up to three identifiers of arbitrary length can be reduced to a smaller size (e.g., each turning on up to eight bits or up to twenty-four bits total out of a 64-bit vector).

Figure 3:
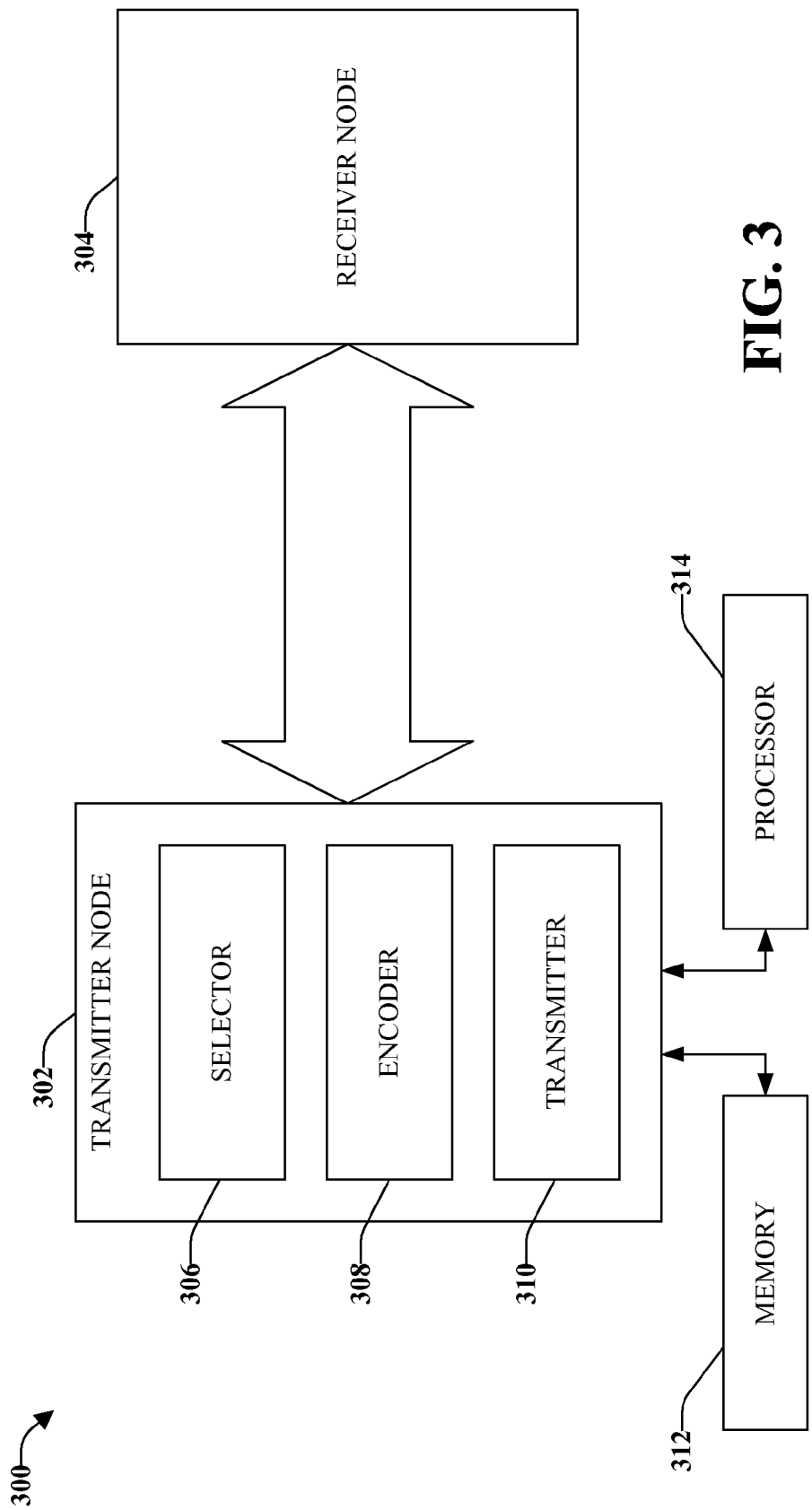
FIG. 3 illustrates an example system that facilitates broadcasting a set of identifiers for peer discovery purposes in a communication environment.

Turning to FIG. 3, illustrated is an example system 300 that facilitates advertising (e.g., broadcasting) a set of identifiers for peer discovery purposes in an ad hoc environment. An individual (service, function, and/or interest, and so forth) might be known by a set of identifiers whereby different people know the individual by different identifiers. Each identifier can be known by a different circle of people. There can be a home email account (e.g., xxx@home.net) and a work email account (e.g. xxx@work.com), for example. An individual might not expect friends to know their work account (e.g. does not want to have to tell everyone when changing jobs) and coworkers to know their home account. Information relating to each account by which the individual is known can be advertised by a device in use by the individual, such as during a peer discovery period, in order to be discoverable by family, friends, coworkers, and so forth. However, periodically broadcasting the identifiers individually is inefficient and can waste resources. Thus, system 300 can provide an efficient manner of advertising (e.g., for peer discovery) when a node is associated with a multiple identifiers.

In more detail, system 300 includes a transmitter node 302 that advertises, announces, or broadcasts its presence to a receiver node 304. It should be understood that more than one transmitter node 302 and receiver node 304 can be included in system 300; however, one of each is shown and described for purposes of simplicity. Transmitter node 302 can announce or broadcast various information including an identification, how to utilize the services of transmitter node 302 in order to communicate within an ad hoc peer-to-peer network, and other information.

In accordance with some aspects, transmitter node 302 can perform the functions of receiver node 304 and receiver node 304 can perform the functions of transmitter node 302. Thus, a single node can both transmit and receive information in accordance with the one or more aspects disclosed in this detailed description. In such a manner, a node can be broadcasting information and at substantially the same time can also be receiving information from other nodes in the vicinity as well as performing other functions (e.g. communicating, relaying information and so forth).

Transmitter node 302 can include a selector 306 that can be configured to choose all or a subset of identifiers (e.g., two or more) associated with transmitter node 302. The selector 306 can choose the one or more identifiers automatically based on various criteria, such as the most frequently used identifiers (usage frequency), a selection of one or more identifiers as primary identifiers (primary indication), a set of identifiers corresponding to currently running applications (current use), or combinations thereof. Additionally or alternatively, a manual entry can override one or more identifiers chosen by selector 306. For example, a user might primarily use a work identifier and a personal identifier and generally, those two identifiers are broadcast using the disclosed aspects. However, the user might also belong to a club and members of the club might be meeting for a convention or another event. The user might desire to include a club identifier within the broadcast information so that members of the club can find him while at the convention. The club identifier can be manually chosen in order to include (or exclude) the desired identifier for broadcast. In accordance with some aspects, there can be considerations that limit the number of identifiers that can be utilized with the disclosed techniques.

Also included in transmitter node 302 can be an encoder 308 that can be configured to accept as inputs two or more identifiers associated with a node (e.g. user of the node). The input identifiers can be processed through a combining mechanism (e.g., hash function or Bloom filter) that combines the identifiers to mark or set to "1" bits of a bit vector that represent the multiple identifiers. The bit vector, with some bits set to "0" and other bits set to "1", which is computed by encoder 308, is transmitted to one or more receiver nodes 304 by a transmitter 310. Further information relating to the inputs and the output bit vector will be provided below.

A memory 312 can be operatively coupled to (or included within) transmitter node 302 to send a sequence of marked bits within a bit vector that represents two or more identifiers associated with transmitter node 302. Memory 312 can store information and/or retain instructions relating to choosing two or more identifiers to advertise (e.g., broadcast) as bits within a bit vector, processing the two or more identifiers through a combining mechanism to produce a multitude of bits set to "1" corresponding to the two or more identifiers, and transmitting the bit vector to nodes within the vicinity. In accordance with some aspects, choosing the two or more identifiers can include converting a public identifier into a private identifier (e.g., by encryption or some hash function), which will be discussed in more detail below.

A processor 314 can be operatively connected to (or included within) transmitter node 302 and/or memory 312 to facilitate processing of information and/or can be configured to execute the instructions retained in memory 312. Processor 314 can be a processor dedicated to computing, transforming, and/or generating information that can be utilized by selector 306, encoder 308 and/or transmitter 310. Additionally or alternatively, processor 314 can be a processor that controls one or more components of system 300, and/or a processor that analyzes information, generates information and/or controls one or more components of system 300.

Figure 4:
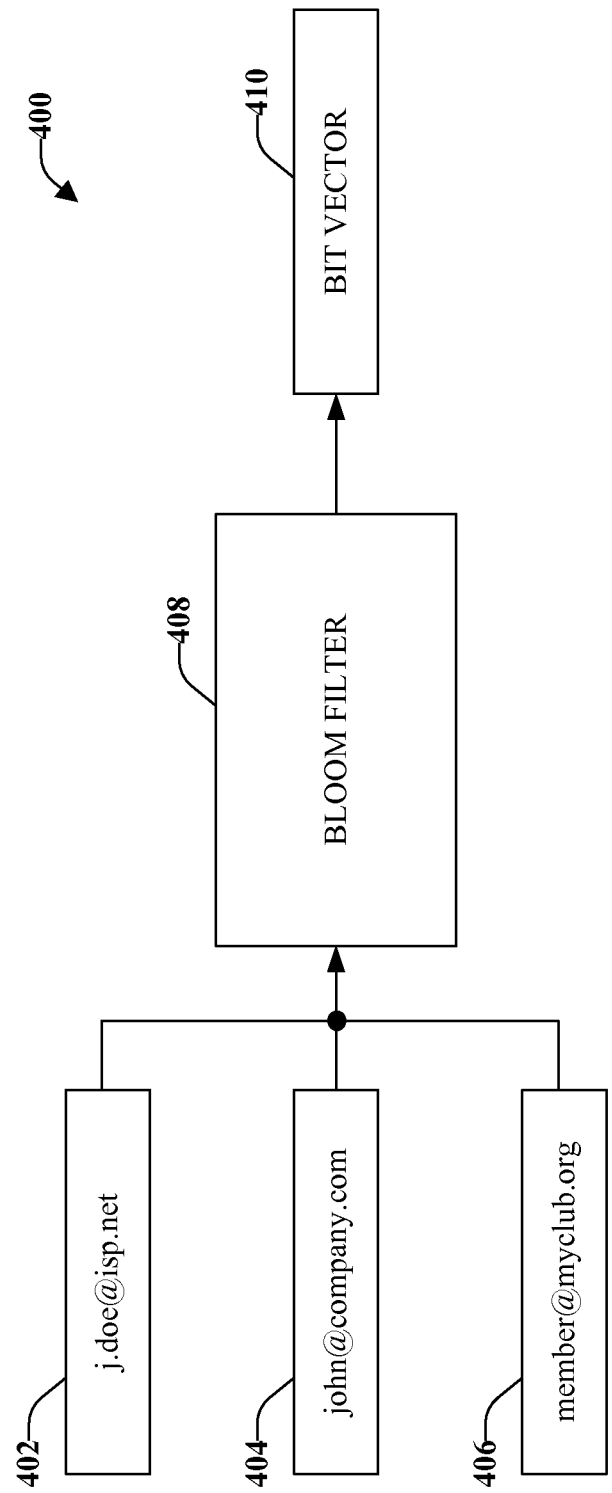
FIG. 4 illustrates an example application of a Bloom filter for discovery with multiple identifier support.

FIG. 4 illustrates an example application 400 of a Bloom filter for discovery with multiple identifier support. A set of identifiers 402, 404, and 406 with which a node is associated are used as inputs, which are the elements or keys, to a filter, such as the illustrated Bloom Filter 408. The output of a Bloom filter is a data structure that enables a probabilistic determination of whether an element is a member of the input set. While false positives can occur with a Bloom filter (e.g., transmitting node appears to be a related peer when it is not), false negatives cannot occur with a Bloom filter. False positives can occur when a transmitting node with a set of identifiers turns on (e.g., sets to "1") a similar subset of bits set by another transmitting node with a different identifier set.

In accordance with this example, "j.doe@isp.net" could represent a Home ID 402, "john@company.com" could represent a Work ID 404, and "member@myclub.org" could represent a Club ID 408. It should be noted that while the identifiers shown in this illustration have similar formats, the identifiers could have different formats (e.g., based on numbers, letters, symbols, other characters, or combinations thereof) and/or lengths (e.g., one can have 50 characters and another 10 characters). A multitude of types and/or combinations of identifiers could be used (e.g., Internet Protocol (IP) address, Network Access Identifiers (NAIs), IPv4 addresses, IPv4 addresses, hardware identifier address, domain names, email address, or combinations thereof). Additionally, the number of identifiers input to the filtering mechanism 408 can vary and the nodes participating in a peer-to-peer network need not have the same number of identifiers. Additionally or alternatively, one or more identifiers input to the filtering mechanism 408 can be a private identifier, which will be described in more detail below.

The output of the filter mechanism 408 is a bit vector 410 that has some bits set to "1" and other bits set to "0." The bit vector can be a fixed set of bits, which can be a factor of the parameters of the filtering mechanism 408. The number of bits can be based on an implementation choice and can depend on the rate at which a node should advertise its identifiers, the efficiency level at which the node should perform, how many different identifiers are to be supported as well as other factors.

The bits set to "1" correspond with an output that represents one or more of the identifiers used as input to the filtering mechanism. The bit vector can be advertised (e.g., via broadcast, multicast, and/or unicast transmission) periodically (or sent at different intervals or upon request) by the respective node for the purpose of peer discovery. Each receiver node can determine whether the bit vector 410 includes any known identifiers by performing a similar operation (e.g., processing a known identity though a combining or filtering mechanism) and determining the bits in a bit vector that should be set to "1" if a known peer is broadcasting the bit vector. The receiving node does not have to be aware of all identifiers used as input, just the one or more identifiers known by the receiving node. Knowing more than one identifier associated with a related peer node can mitigate false positives since more bits within the bit vector that should be set to "1" (e.g., corresponding with two or more identifiers) is known. However, it should be understood that some combining mechanisms used with the disclosed aspects might be of such a nature that all identifiers used as input should be known by the receiving node to determine which bits should be set to "1".

Figure 5:
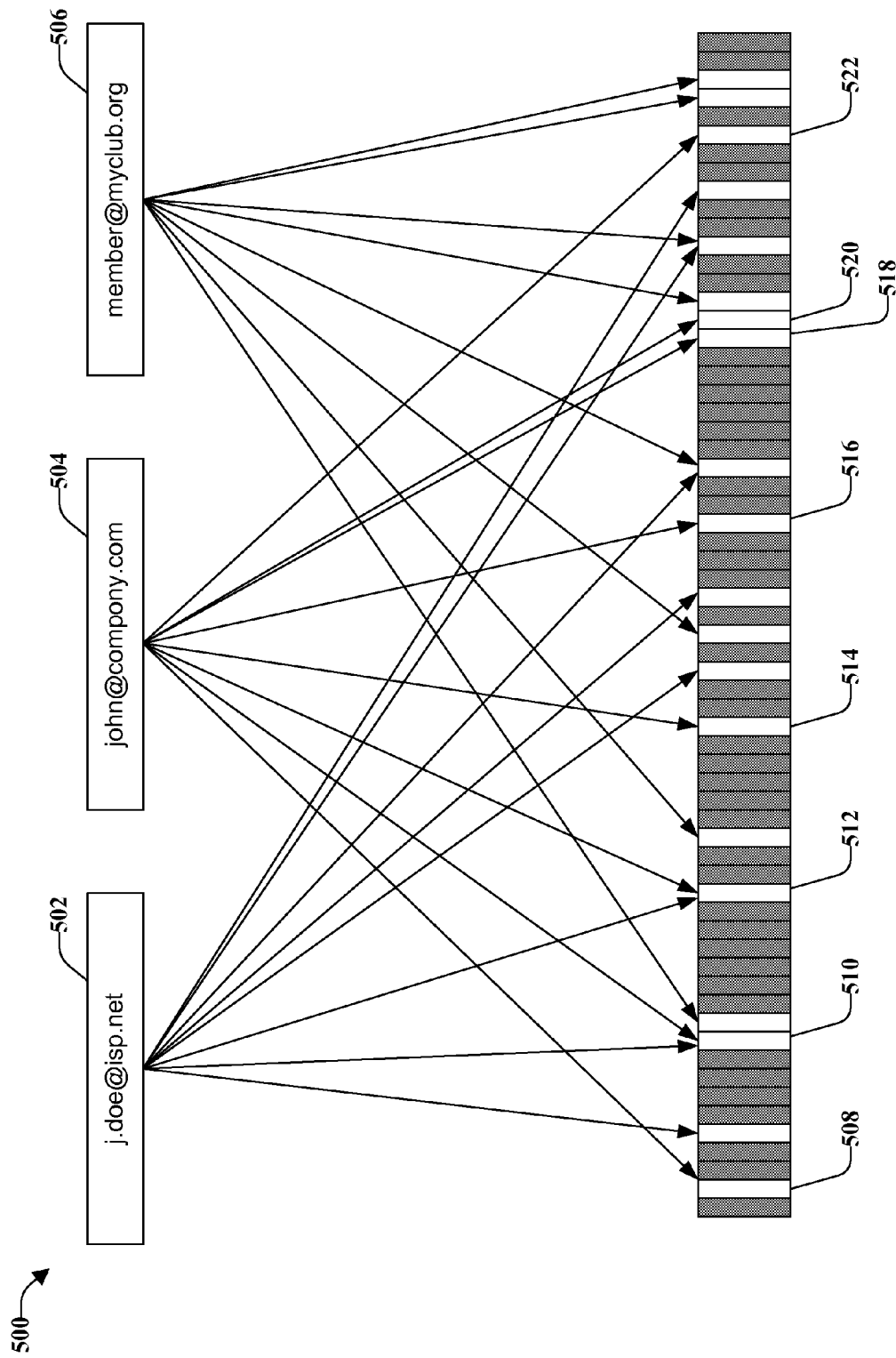
FIG. 5 depicts a conceptual illustration of a bit vector output computed from multiple identifiers that were used as input.

FIG. 5 depicts a conceptual illustration of a bit vector output 500 computed from multiple identifiers, which were used as input to a Bloom filter. However, the disclosed aspects can be utilized with numerous types of combining and/or filtering mechanisms and a Bloom filter is simply one example of such a mechanism.

The output of the Bloom filtering mechanism is a bit vector. A subset of bits within the bit vector correspond to each of the input elements or keys (e.g., identifiers) is marked (e.g., set to "1"). The bits that are marked are a function of the filter mechanism and the one or more algorithms used by the filter. For example, if an identifier is to produce eight bits as an output (although another number of bits can be used), the input can be processed through eight different hashes. Thus, each hash can choose a bit to turn on or activate (e.g., set to "1").

For example, in the figure, the input john@company.com 504, marks (or turns "on") bits labeled, 508, 510, 512, 514, 516, 518, 520 and 522. While this single input 504 turns on eight bits, a different number of bits can be turned on or marked, depending on a desired configuration. Additionally, two or more inputs (e.g., identifiers) can mark (e.g., turn on) the same output bit, such as bit 512. Thus, there can be some overlap in the marked bits such that a subset of the number of selected bits output are marked (e.g., bits set to "1") by two or more identifiers. However, it should be understood that an input should not result in more than a predetermined number of output bits being marked within the bit vector (e.g., the number of bits set to "1" should be below a threshold level).

In accordance with some aspects, a transmitting node and/or a receiving node can take into consideration the number of bits that are set to "1" in a bit vector. For example, a bit vector might include a certain number of bits (e.g., 32, 64, and so forth) and a maximum number of bits that can be set to "1" (e.g., upper bound, threshold level) can be predetermined to mitigate false positives (e.g. due to spoofing attacks). In such cases, if an output of the filtering mechanism would result in more than the predetermined number of allowed marked bits (e.g., set to "1"), the transmitting node can reduce the number of identifiers used as inputs.

A receiving node can take into consideration the number of bits that are set to "1" in a bit vector, by ignoring bit vectors that have more than a predetermined number of set bits. In such a manner, a transmitting node can be identified as a potential malicious node that is attempting to appear as many different people (e.g., node users). It might also indicate that there is a problem with the transmitting node (e.g., defective software, malfunctioning device, and so forth).

For example purposes and not limitation, each input (e.g., identifier) to a filtering mechanism can activate 8 bits. For a 64-bit vector, the maximum number of bits allowed to be set to "1" can be 24, which can represent at least three identifiers. However, in some situations a fourth identifier (or more) can be used as input, if such identifier sets to "1" bits that are already set by one or more of the three other identifiers. At substantially the same time as receiving the bit vector (or a subset of the bit vector) that appear to be associated with a known identifier, the receiving node can ask for confirmation whether the transmitting node is associated with the known identifier (e.g., the nodes may proceed through an authentication signaling exchange).

Figure 6:
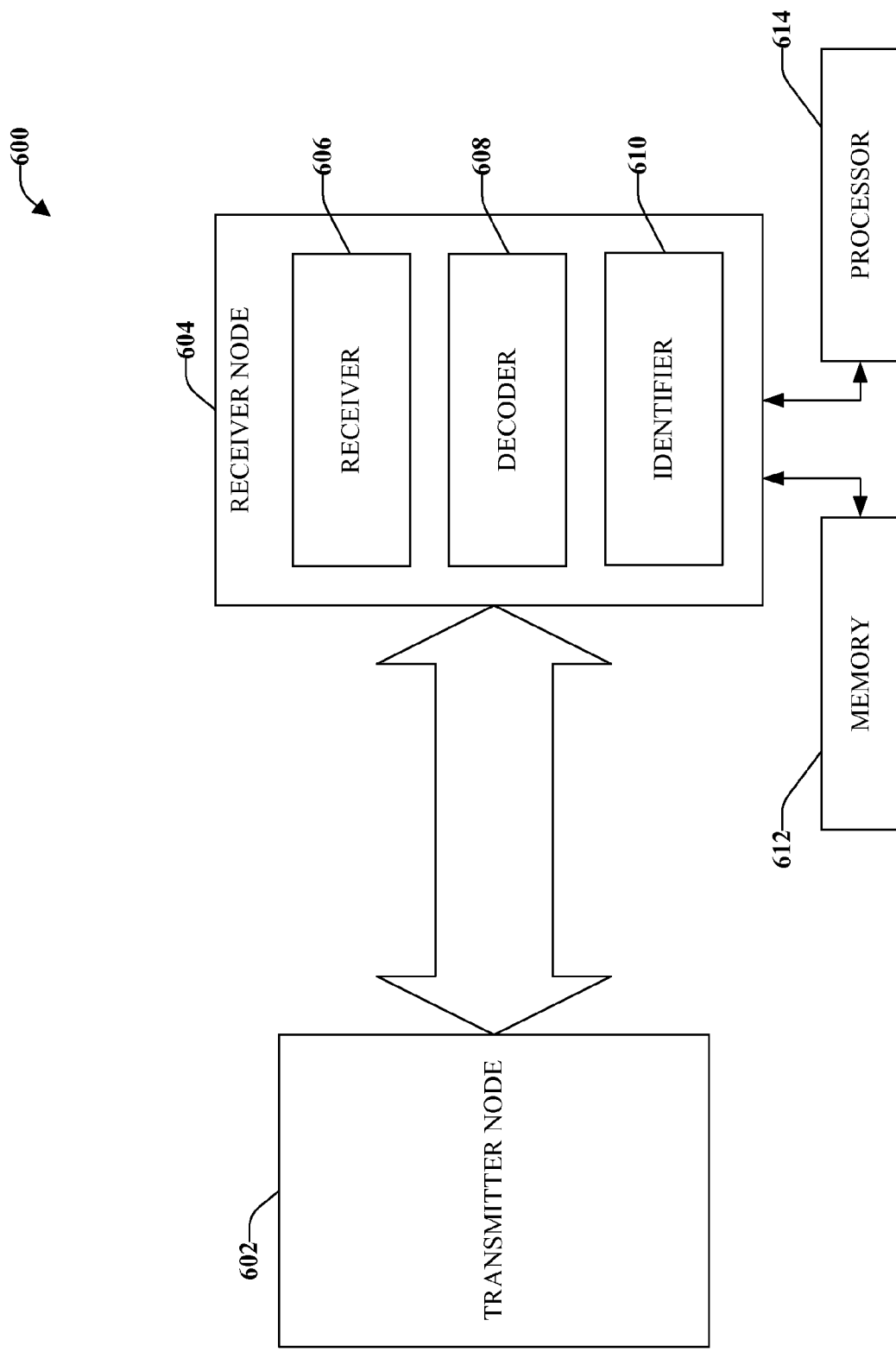
FIG. 6 illustrates an example system that determines if a known identifier of a related peer may have been used as an input to produce active bits within a received bit vector.

Now referring to FIG. 6, illustrated is an example system 600 that determines if a known identifier of a related peer might have been used as an input to produce active bits within a received bit vector. As nodes are moved around various geographic areas (or remain stationary), information relating to each node (e.g. identifier and so forth) are advertised (e.g., broadcast) to other nodes within the geographic area, such as during peer discovery.

System 600 includes a transmitter node 602 that is in wireless communication with a receiver node 604. Transmitter node 602 can periodically, upon request, or at other intervals, advertise (e.g. broadcast, multicast, and/or unicast mechanisms) information relating to the identifier(s) of transmitter node 602 as well as other information relating to communicating with (or through) transmitter node 602 for peer discovery purposes. Receiver nodes 604 that obtain such advertisements, such as through a receiver 606, can selectively determine whether to communicate with transmitter node 602. The determination can be made based on whether transmitter node 602 is an explicitly related peer (e.g., contact, buddy, friend, family member, co-worker, application of interest, service of interest, and so forth).

To facilitate a determination whether a transmitter node 602 is an explicitly related peer, a decoder 608 can be configured to analyze a bit vector received from transmitter node 602. The analysis can include ascertaining which bit vectors should be "on", set to "1", or marked if a related peer node is advertising its identifier as known by receiver node 604. Decoder 608 can determine the bit vectors that should be received by processing the known identifier though a filter similar to the filter used by transmitter (related peer) node 602 to turn on certain bits within the bit vector. As such, decoder 608 can determine which bits within the bit vector should be "on" if transmitter (related peer) node 602 is within the vicinity and is advertising an identifier known by receiver node.

In some situations, two or more nodes can have similar bits turned "on" and it might be uncertain if the actual transmitter node 602 advertising the particular bits is the related peer. Thus, an identifier 610 can be configured to determine (e.g., by proceeding through an authentication signaling/message exchange) if it is the transmitter node 602 associated with the known identifier. The identifier 610 can send a query or message to transmitter node 602 automatically when a number of bits set to "1" are received indicating that the transmitting node 602 might be a peer. In accordance with some aspects, the receiver node 604 can display on a display or screen a listing of peers (e.g., contact list) and one of the peers can be identified (e.g., highlighted, marked as within the vicinity, or identified by other means) to notify a user of the presence of a peer. The user can manually select whether or not to initiate communication and/or to send a query to transmitter node 602 to determine if it is the known related peer. The chance of a false positive can be a function of various parameters including how many bits are being advertised by the transmitter node 602, how many identifiers were used by the transmitter node 602 as input, the number of identifiers by which receiver node knows the transmitter node 602, and so forth. A bit vector of a longer length having a small number of identifiers (e.g., 2) as input can further mitigate the occurrence of a false positive.

The entire bit vector does not have to be received (or sent by transmitter node 602) at substantially the same time. Over some time interval (e.g., up to a minute) the entire bit vector can be received. Receiving node 604 does not have to wait until the entire bit vector is received to make a determination that transmitting node 602 might be the peer node. For example, if a certain number of bits (e.g., 8) are expected to be set to "1", a confidence level can be achieved as a subset of the bit vector is received and a sufficient portion of the marked bits are received (e.g., 5 out of 8 bits are set as expected). Thus, an early guess that it might be the peer node can be based on a confidence level and can make detection of a peer node quicker during peer discovery. However, earlier detection (e.g., before the entire set of bits are received) can increase the chances of a false positive. This type of shortcutting can speed up the detection process at the expense of less certainty at the time of detection, and thus potentially more frequent unsuccessful confirmation signaling. If a bit that is expected to be set to "1" is not set, it verifies that the transmitting node 602 is not the peer node.

In accordance with some aspects, to aid in quick detection of a transmitting node, habits of the user of the transmitting node can be utilized with the set bits. For example, a coworker might be in the office at certain times of the day. The likelihood that when a sequence of set bits are received and it is a particular time of day when the user of the node is generally in the vicinity (e.g., at work), there is more certainty that it is the peer node. However, if the set of bits are received at a time when the coworker is not usually in the office (e.g. 11 p.m. on a Saturday), there can be uncertainty based on whether it is the coworker. The habits of the user can include historical types of behavior patterns or location information or other inputs (e.g., schedule, itinerary, favorite places, and so forth) that can be used as a way of narrowing down the likelihood of false positives and obtain more certainty when certain bits are received that it is the known peer.

A memory 612 can be operatively coupled to (or included within) receiver node 604 to decode a sequence of bits that should be set to "1" if a transmitter node is advertising an identifier known by receiver node 604. Memory 612 can store information and/or retain instructions relating to receiving bit vectors from one or more nodes, decoding the bit vector, determining which bits should be "on" or set to "1" for an explicitly related peer (e.g., bits corresponding to a known identifier), and verifying whether the transmitting node is the known peer. Memory 612 can also retain instructions relating to converting a public known identifier of a peer node to a private identifier based on a received key. Memory 612 can further retain instructions related to retaining information associated with known patterns, habits, locations, or other information of a peer and using the retained information while verifying whether the transmitting node is likely to be the known peer. Memory 612 can further retain instructions related to ignoring a bit vector from a node if the number of bits active (e.g., turned on) exceed an upper bound or threshold number of set bits.

A processor 614 can be operatively connected to (or located within) receiver node 604 and/or memory 612 to facilitate analysis of received information and/or can be configured to execute the instructions retained in memory 612. Processor 614 can be a processor dedicated to analyzing information received from transmitter node 602 and/or generating information that can be utilized by receiver 606, decoder 608 and/or identifier 610. Additionally or alternatively, processor 614 can be a processor that controls one or more components of system 600, and/or a processor that analyzes information, generates information and/or controls one or more components of system 600.

Figure 7:
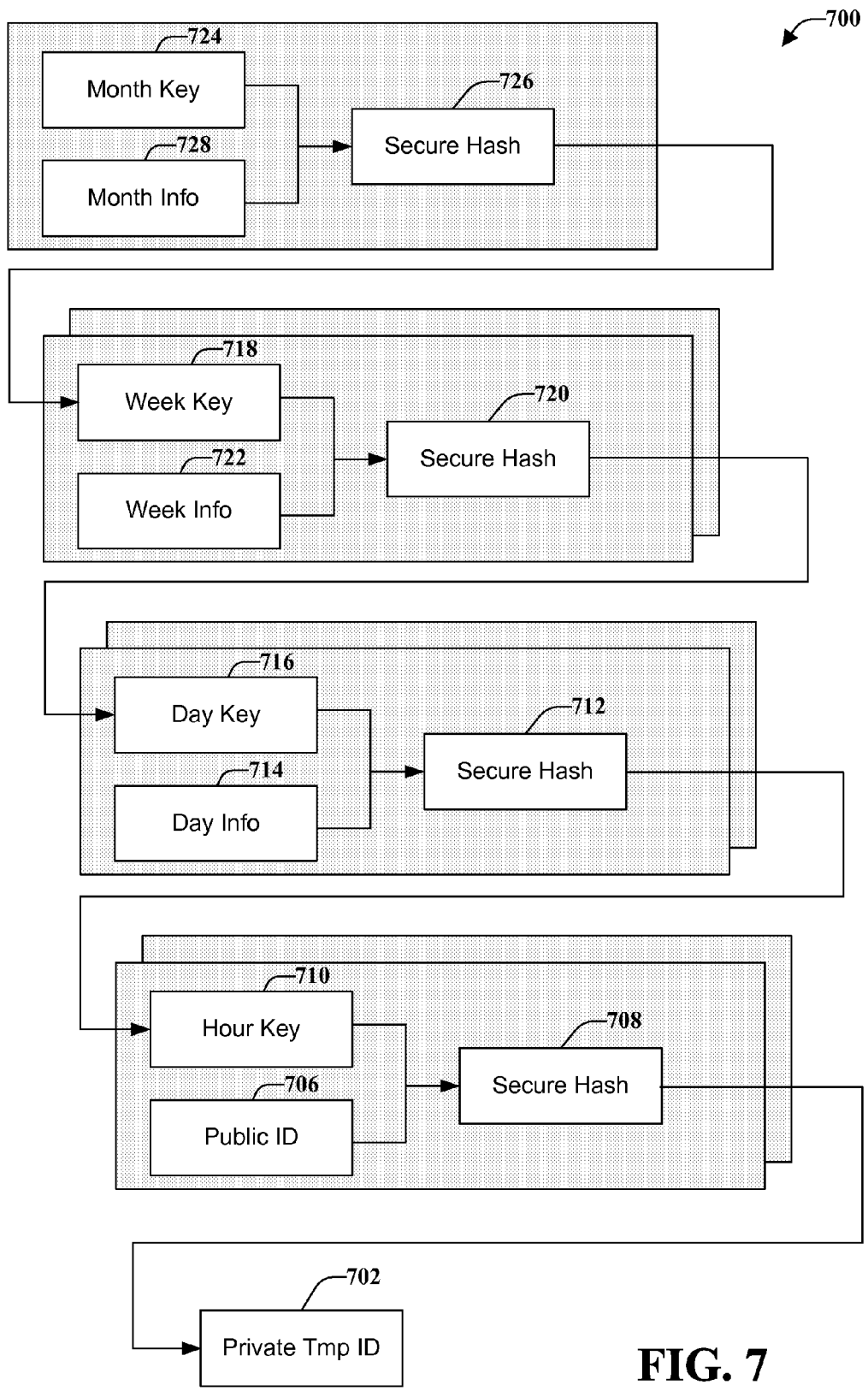
FIG. 7 illustrates a sequence of keys with differing periods of usability for private temporary identifiers in accordance with the disclosed aspects.

FIG. 7 illustrates a sequence of keys 700 with differing periods of usability for private temporary identifiers in accordance with the disclosed aspects. A node can be configured to broadcast private identifiers, rather than publicly known identifiers to allow device users to have their presence announced for a specified interval to other identified device users, thus adding a level of security. The presence can be announced by respective nodes in a manner that retains privacy to the user whose presence is being announced to a select group of individuals. For example, an individual might want to spend a day visiting various areas or shopping and might not want everyone within the vicinity to know his location (especially if the individual is well known). A node associated with the individual can selectively announce its presence to a circle of friends through selective key distribution.

Selective key distribution can address the concern of enabling discovery between explicitly related peers in a peer-to-peer network while mitigating compromising anonymity with respect to other unrelated peers. Additionally, as relationships may be transient and of unequal time durations, it is desirable to provide time limitations and/or other controls over periods during which explicitly related peers can discover one another.

In the following discussion, it is assumed that each node participating in the peer-to-peer network has relatively permanent and publicly known identifiers, such as a network access identifier (e.g., j.doe@isp.com), an Internet Protocol address, or another identifier. However, advertisement (e.g., periodic broadcast) of that identifier for the purpose of peer discovery can compromise anonymity. Thus, an alternative (e.g., private) identifier can be used for the purpose of peer discovery, where the alternative identifier is only known by the explicitly related peers. The private identifier may be explicitly conveyed to a related peer and only valid for a limited time (e.g., it may be a temporary or transient identifier) and thus has a particular validity range. It should be noted that a variety of means can be utilized to establish the validity range of the temporary identifiers and such means are not limited to a duration of time, although it is easy to think of a validity range in terms of time. The range can be temporal-based, numerical-based or based on other criteria, provided there is a system, method or other means for determining when the validity range starts and ends.

Security and control can be provided by determining a private identifier to broadcast based on a secure hash of a permanent identifier with a security key (e.g., where the security key has been previously conveyed to the explicitly related peer(s) and may have only a limited lifetime).

In accordance with the illustrated example of FIG. 7, a private temporary identifier 702 is determined by executing a secure hash operation 704 on the permanent or public identifier 706 with a key that is only valid for the current hour, such as hour key 708. The hour key 708 can be securely conveyed to a peer that should only be able to perform discovery for the hour. In addition, the hour key 708 can be determined by executing a secure hash operation 712 on some day information 714 (e.g. pseudo random information corresponding to the day) with a key that is valid for the day, such as day key 716. This operation on the day information 714 with the day key 716 could produce a set of hour keys (e.g., one for each hour of a particular day). Thus, a peer to which the day key 716 has been securely conveyed can determine the hour key for each hour of the day and, thus, determine the private temporary identifier 702 used for peer discovery during each hour of the day. In a similar manner, a week key 718 can be determined by executing a secure hash operation 720 on some week information 722 (e.g., pseudo random information corresponding to the week). Some peers may be given the week key 718 that enables determination of the private temporary identifiers used throughout the week. Likewise, a month key 724 can be determined by executing a secure hash operation 726 on some month information 728 (e.g., pseudo random information corresponding to the week).

It should be noted that a peer having a key higher in the hierarchy 700 can derive a lower level key in order to determine the private temporary id 702 used at any time prior to the expiration of the received key. For example, a peer given the month key 724 can determine each key lower in the hierarchy to derive a current alternative temporary key. A peer that knows the week key 718 can derive the respective day keys and hour keys, which are lower in the hierarchy. In a similar manner, a peer with the day key 716 can derive the respective hour keys 708 for the validity periods of the day. Thus, knowledge of a key within a hierarchy can supply information needed to derive keys lower in the hierarchy.

However, keys cannot be used to derive keys higher in the hierarchy. Thus, a peer with the week key 718 cannot derive the month key 724; a peer with the day key 716 cannot derive the week key 718 or month key 724 and a peer knowing the hour key 708 cannot determine the keys 716, 718, 724, which represents a longer validity period. Thus, as the end range associated with a duration of a supplied key expires, a peer desiring to establish a peer-to-peer communication with the user associated with distributed keys needs to have the keys explicitly assigned. In such a manner, the alternative identifier can be explicitly conveyed to related peers and are valid for a limited time. In accordance with some aspects, the keys can be implicitly revoked prior to the expiration of the validity range.

The temporary private identifier 702 used at any particular time can be used as one or more of the inputs to the filtering mechanism as disclosed in this detailed description. As such, a peer receiving the bit vectors can only determine if an associated peer is within a vicinity (through peer discovery) by knowing a respective key and determining which bits should be "on" corresponding to the private temporary identifier.

Figure 8:
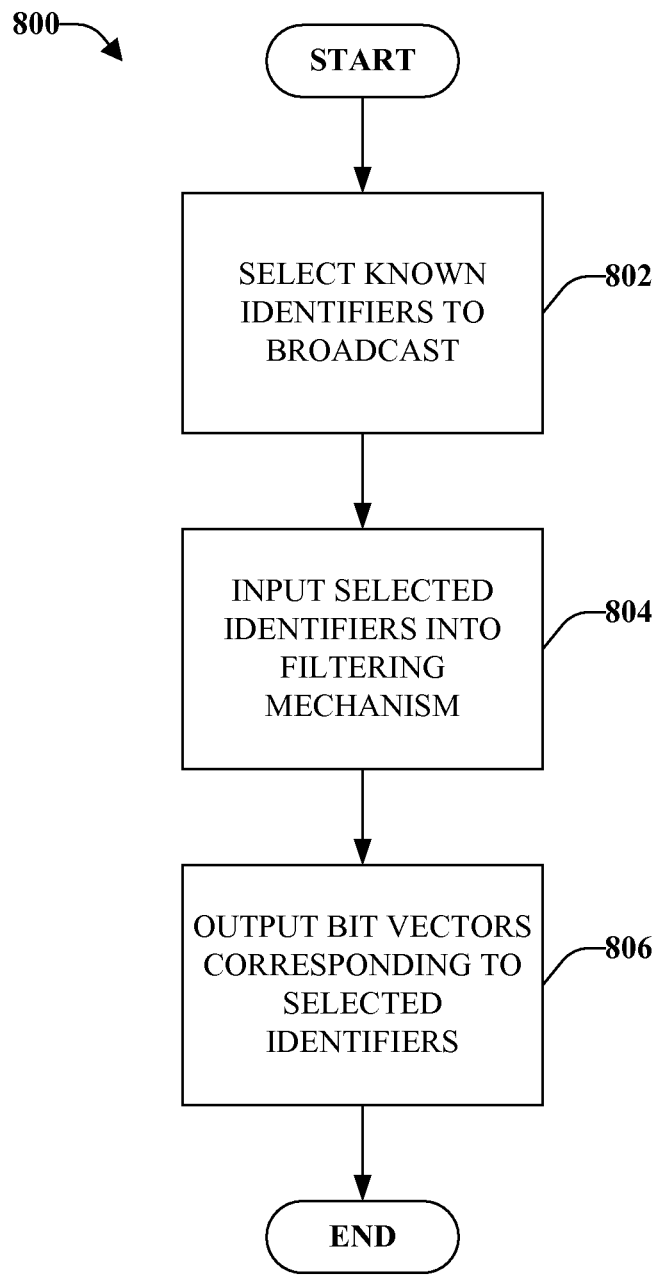
FIG. 8 illustrates a method for creating a sequence of bits that represent two or more known identifiers for broadcast during peer discovery.
Figure 9:
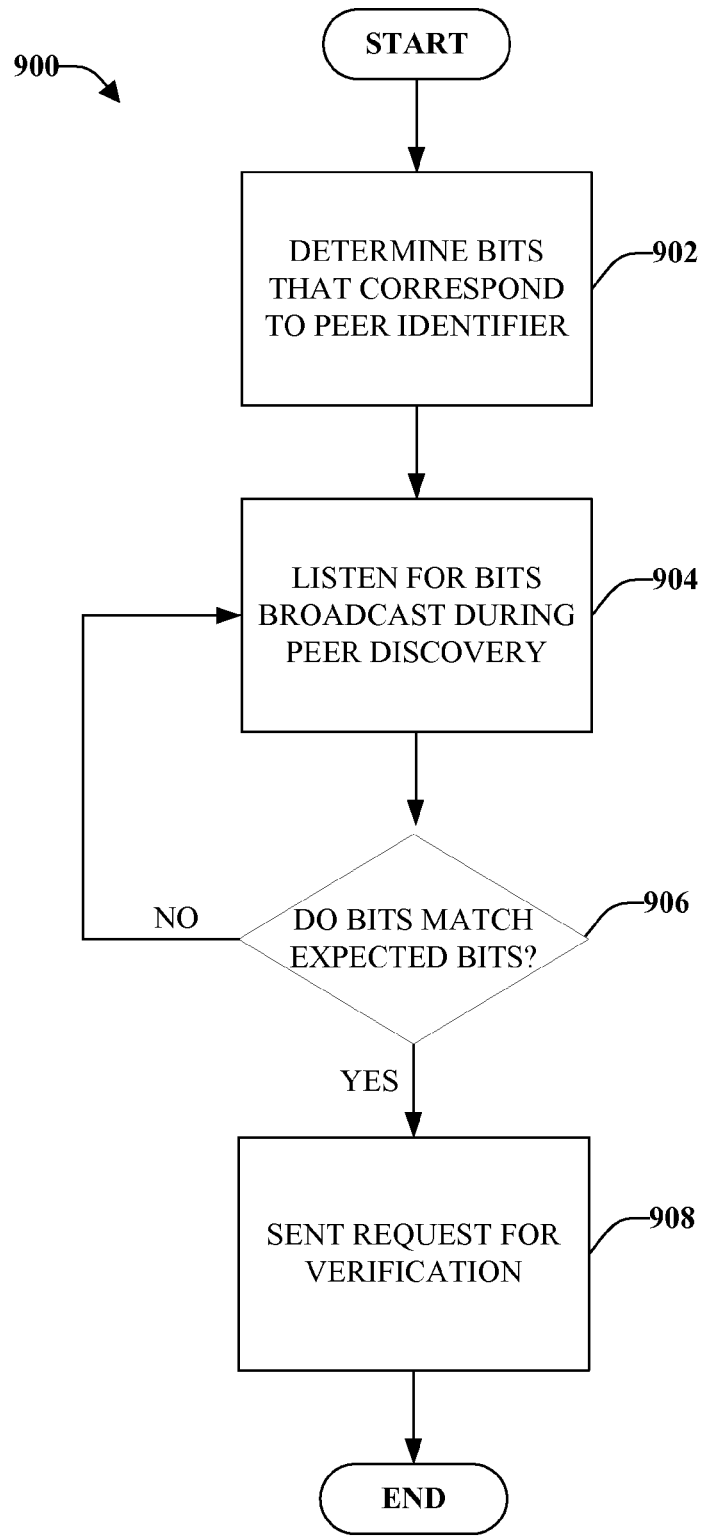
FIG. 9 illustrates a method for receiving and decoding marked bits included in a bit vector for peer discovery purposes.

Referring to FIGS. 8-9, methodologies relating to peer-to-peer temporary identifiers are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Now turning to FIG. 8, illustrated is a method 800 for creating a sequence of bits that represent two or more known identifiers for broadcast during peer discovery. Method 800 combines two or more known identifiers and converts such identifiers into a bit vector containing bits set to "1" and bits set to "0", which can be broadcast for peer discovery purposes. Converting the identifiers into bit vectors mitigates the need to individually broadcast each of the known identifiers.

Method 800 starts, at 802, when two or more known identifiers are selected. The identifiers can be automatically selected based on various factors (e.g., most used identifiers (usage frequency), identifiers marked as primary (primary indication), identifier currently being used to communicate (a current use), and so forth), manually selected, or a combination of both automatic and manual selection. Additionally, the identifiers selected can be changed at any time. Various identifiers can be used with the disclosed aspects, such as Network Access Identifiers, IPv4 addresses, IPv6 addresses, hardware identifier address, email address, or combinations thereof. In accordance with some aspects, one or more of the identifiers can be private temporary identifiers used to maintain a level of confidentiality or anonymity during the peer discovery process.

At 804, the selected identifiers are processed through a filtering mechanism (e.g., hash algorithm, multiple hash algorithms) to produce a sequence of marked bits. The filtering mechanism can be a Bloom filter; however, other mechanisms can be utilized. The filtering mechanism can determine which bits should be marked or set to "1" for each of the input identifiers. A single bit can be selected (e.g., set to "1") by two or more of the identifiers. In accordance with some aspects, there can be an upper bound set on the number of bits that can be set to "1". There might be a limited number of total bits available within the bit vector and having too many bits marked or turned "on" might result in numerous false positives, which can make a receiving node believe that a transmitting node is a related peer, when it is not the related peer.

An example of a false positive can occur when an individual (e.g., transmitting node) is known by a work identifier. A receiving node can be expecting certain bits in a bit vector being advertised to be set to "1", which indicate that the work identifier might have been used as one of the inputs. However, there is a possibility that another node with different identifiers can set the same bits to "1" as would be set by the work identifier. The receiving node might falsely believe that the transmitting node is the individual associated with the work identifier. Thus, the bits set to "1" can indicate a potential that the transmitting node is the work associate. A query or communication can be automatically sent to the transmitting node to determine if it is the work associate.

The bit vector is broadcast or announced periodically or upon request for purposes of peer discovery, at 806. Nodes receiving the bit vector can selectively determine whether the broadcasting node is a known peer and can establish communication if the transmitting node is the node peer.

FIG. 9 illustrates a method 900 for receiving and decoding marked bits included in a bit vector for peer discovery purposes. As a node receives information from other nodes during peer discovery, the other nodes can be conveying information relating to respective identifiers. Nodes receiving this information can ascertain whether the broadcast is from a related peer by matching various received bits with expected bits (e.g., set to "1"). If the bits received that are set to "1" are the bits expected to be set to "1", further confirmation can be solicited from the sending node to verify whether the sending node is the desired node.

At 902, a determination is made relating to the bits that should be marked (e.g., turned "on", set to "1") if a particular peer node is broadcasting a known identifier. This determination can be made by processing the known identifiers of the peer node though a filtering mechanism similar to the filtering mechanism utilized by the peer node. As the node is operated, it can listen (continuously, periodically), at 904, for broadcast information that might be sent by other devices within a similar geographic area. The other nodes can be sending various bits that are marked or set to "1" which represent a corresponding known identifier.

As the marked bits are received, a determination is made, at 906, whether the marked bits are the bits that were expected to be marked if a peer node was broadcasting its public identifier. Although a bit vector can be a particular length, the entire bit vector does not have to be received before a determination is made that the broadcasting node might be the related peer node. For example, if an amount of bits are received that indicate a confidence level that the sender of the bits could be the related peer node ("YES"), method 900 can continue, at 908, when a request for verification whether the sending node is the related peer node is sent. The request can include a communication or other information conveyance to the peer node. If a bit that was expected to be "on" was not "on" in the bit vector received from the transmitting node ("NO"), it indicates that the transmitting node is not the related peer node. In this situation, method 900 continues at 904 with listening for information conveyance from nodes for peer discovery purposes and receiving at least a subset of a bit vector from a node in an ad hoc network.

In accordance with some aspects, if it is detected that a node is transmitting a bit vector that has an excessive amount of bits marked (e.g., set to "1") it can indicate that the sending node is acting in a malicious manner, is not performing properly, used too many identifiers as inputs to the filtering mechanism, or some other problem. Receipt of a bit vector having too many active bits can result in false positives since it is possible that the active bits can make it appear as if multiple related peers are within range when that might not be the case. In such a situation, the bit vector (and node sending the bit vector) can be selectively ignored or disregarded.

It will be appreciated that, in accordance with one or more aspects described herein, inferences can be made regarding which identifiers to use as inputs or keys to the filtering mechanism, the number of inputs that can be used, the number of output bits that can be marked (e.g., set to "1"), which input bits should be changed to a private temporary identifier before processing, and so forth. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more aspects described herein can include making inferences pertaining to selectively modifying one or more inputs to the filtering mechanism as a device is operated. According to another example, an inference can be made relating to ascertaining a filtering mechanism used by a transmitting device in order to identify bits that should be marked in a received bit vector if a known peer node is transmitting identification information. In accordance with another example, an inference can be made relating to selecting a combination of different types and configurations of identifiers to process through a filtering mechanism. It will be appreciated that the foregoing examples are illustrative in nature and are not intended to limit the number of inferences that can be made or the manner in which such inferences can be made in conjunction with the various examples described herein.

Figure 10:
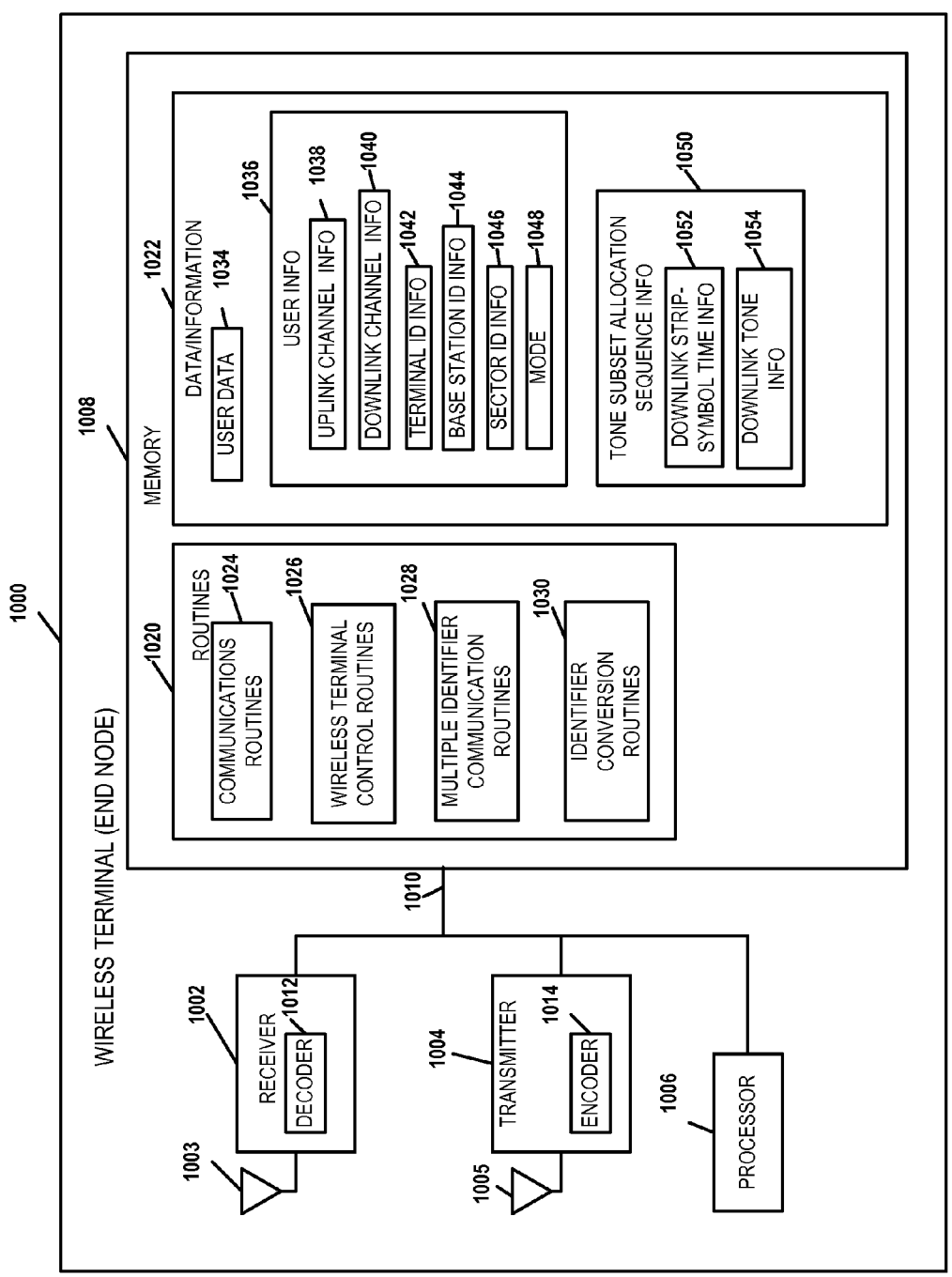
FIG. 10 illustrates an example wireless terminal in accordance with one or more of the disclosed aspects.

FIG. 10 illustrates an example wireless terminal 1000 that can be used as any one of the wireless terminals (e.g., transmitter node, receiver node, . . . ), of the disclosed aspects. Wireless terminal 1000 includes a receiver 1002 including a decoder 1012, a transmitter 1004 including an encoder 1014, a processor 1006, and memory 1008 which are coupled together by a bus 1010 over which the various elements 1002, 1004, 1006, 1008 can interchange data and information. An antenna 1003 used for receiving signals from a base station and/or other devices is coupled to receiver 1002. An antenna 1005 used for transmitting signals (e.g., to base station and/or other wireless terminals) is coupled to transmitter 1004.

The processor 1006 (e.g., a CPU) controls operation of wireless terminal 1000 and implements methods by executing routines 1020 and using data/information 1022 in memory 1008. Data/information 1022 includes user data 1034, user information 1036, and tone subset allocation sequence information 1050. User data 1034 may include data, intended for a peer node, which will be routed to encoder 1014 for encoding prior to transmission by transmitter 1004 to base station and/or other devices, and data received from the base station and/or other devices, which has been processed by the decoder 1012 in receiver 1002. User information 1036 includes uplink channel information 1038, downlink channel information 1040, terminal ID information 1042, base station ID information 1044, sector ID information 1046, and mode information 1048. Uplink channel information 1038 includes information identifying uplink channels segments that have been assigned by base station for wireless terminal 1000 to use when transmitting to the base station. Uplink channels may include uplink traffic channels, dedicated uplink control channels (e.g. request channels, power control channels and timing control channels). Each uplink channel includes one or more logic tones, each logical tone following an uplink tone hopping sequence. The uplink hopping sequences are different between each sector type of a cell and between adjacent cells. Downlink channel information 1040 includes information identifying downlink channel segments that have been assigned by base station for use when a base station is transmitting data/information to wireless terminal 1000. Downlink channels may include downlink traffic channels and assignment channels, each downlink channel including one or more logical tone, each logical tone following a downlink hopping sequence, which is synchronized between each sector of the cell.

User information 1036 also includes terminal identification information 1042, which is a base station assigned identification, base station identification information 1044 which identifies the specific base station that wireless terminal 1000 has established communications with, and sector identification info 1046 which identifies the specific sector of the cell where wireless terminal 1000 is presently located. Base station identification 1044 provides a cell slope value and sector identification info 1046 provides a sector index type; the cell slope value and sector index type may be used to derive tone-hopping sequences. Mode information 1048 also included in user information 1036 identifies whether the wireless terminal 1000 is in sleep mode, hold mode, or on mode.

Tone subset allocation sequence information 1050 includes downlink strip-symbol time information 1052 and downlink tone information 1054. Downlink strip-symbol time information 1052 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1054 includes information including a carrier frequency assigned to the base station, the number and frequency of tones, and the set of tone subsets to be allocated to the strip-symbol periods, and other cell and sector specific values such as slope, slope index and sector type.

Routines 1020 include communications routines 1024, wireless terminal control routines 1026, multiple identifier communication routines 1028, and identifier conversion routines 1030. Communications routines 1024 control the various communications protocols used by wireless terminal 1000. For example, communications routines 1024 may enable communicating through a wide area network (e.g., with base station) and/or a local area peer-to-peer network (e.g., directly with disparate wireless terminal(s)). By way of further example, communications routines 1024 may enable receiving a broadcast signal (e.g., from base station). Wireless terminal control routines 1026 control basic wireless terminal 1000 functionality including the control of the receiver 1002 and transmitter 1004. Multiple identifier communication routines 1028 control selecting two or more identifiers associated with a device and processing the identifiers through a hash function or filtering mechanism to efficiently broadcast the multiple identifiers while mitigating the need to advertise each identifier individually. The identifiers can relate to any identification associated with a user of a device, a desired function, service, or interest, or other information. Identifier conversion routines 1030 can control determining which information (e.g., which bits should be set to "1") a peer device should be broadcasting if the device is within communication range.

Figure 11:
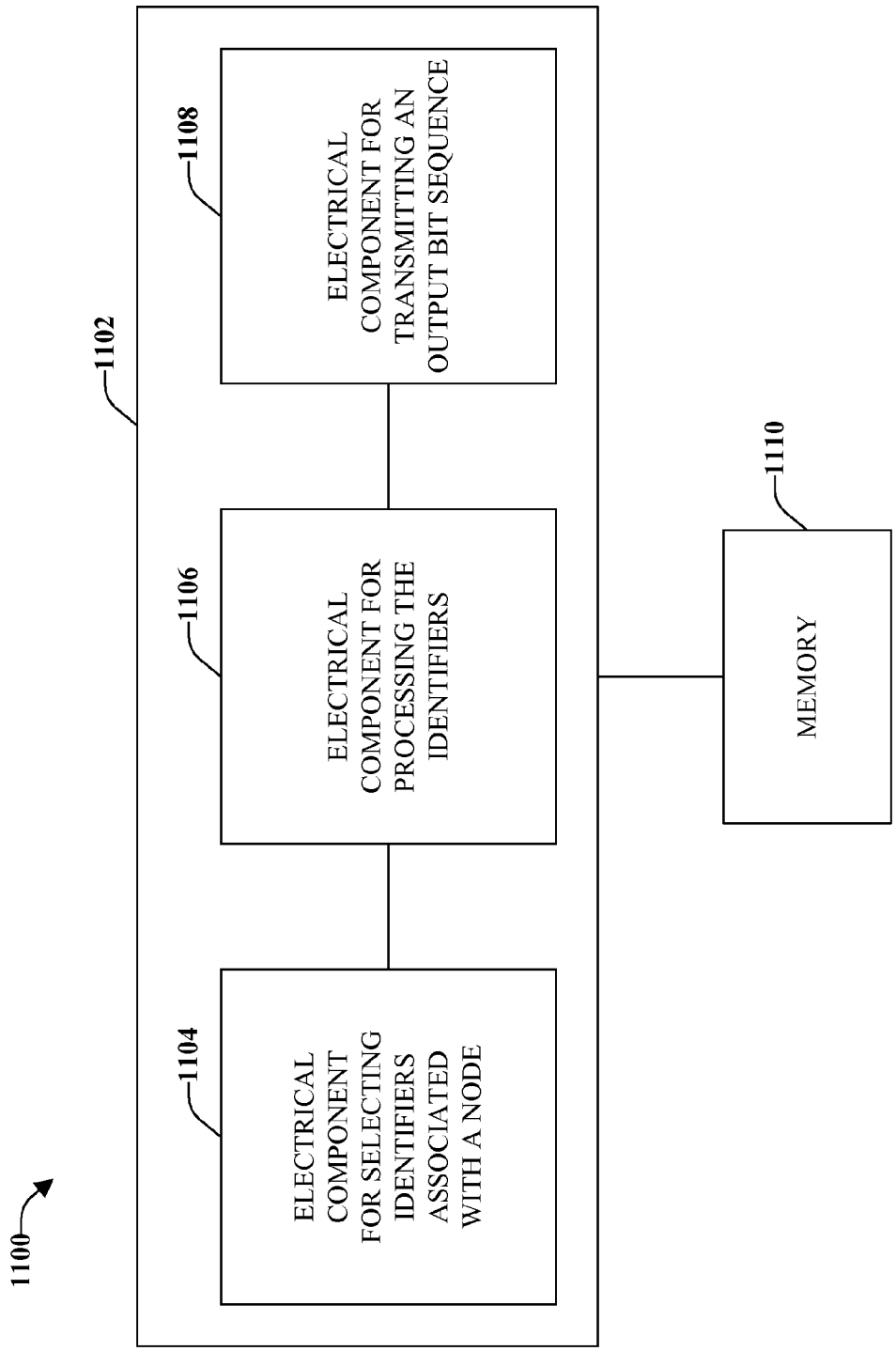
FIG. 11 illustrates an example system that assigns a temporary identifier and selectively distributes the identifier to facilitate peer discovery in a communication environment.

With reference to FIG. 11, illustrated is an example system 1100 that broadcasts at least two identifiers using a bit vector to facilitate peer discovery in an ad hoc environment. System 1100 can reside at least partially within a mobile device. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. For instance, logical grouping 1102 can include an electrical component for selecting at least a subset of identifiers associated with a node 1104. Pursuant to an illustration, the identifiers can be selected automatically, manually, or combinations thereof. For example, a manual input can specify at least one identifier of the subset of identifiers. Additionally, there can be a limit on the number of identifiers that can be selected. Further, logical grouping 1102 can include an electrical component for processing the subset of identifiers 1106 to produce an output bit sequence that comprises marked bits. The bits can be marked by setting the bits from "0" to "on" or "1" or though some other manner of marking. Moreover, logical grouping 1102 can include an electrical component for transmitting the output bit sequence 1108 to a multitude of receiver nodes located in the ad hoc environment. In accordance with some aspects, logical grouping 1102 can include an electrical component for limiting the number of marked bits within the bit sequence (e.g., to mitigate false positives).

Additionally, system 1100 can include a memory 1110 that retains instructions for executing functions associated with electrical components 1104, 1106, and 1108 or other components. While shown as being external to memory 1110, it is to be understood that one or more of electrical components 1104, 1106, and 1108 may exist within memory 1110.

Figure 12:
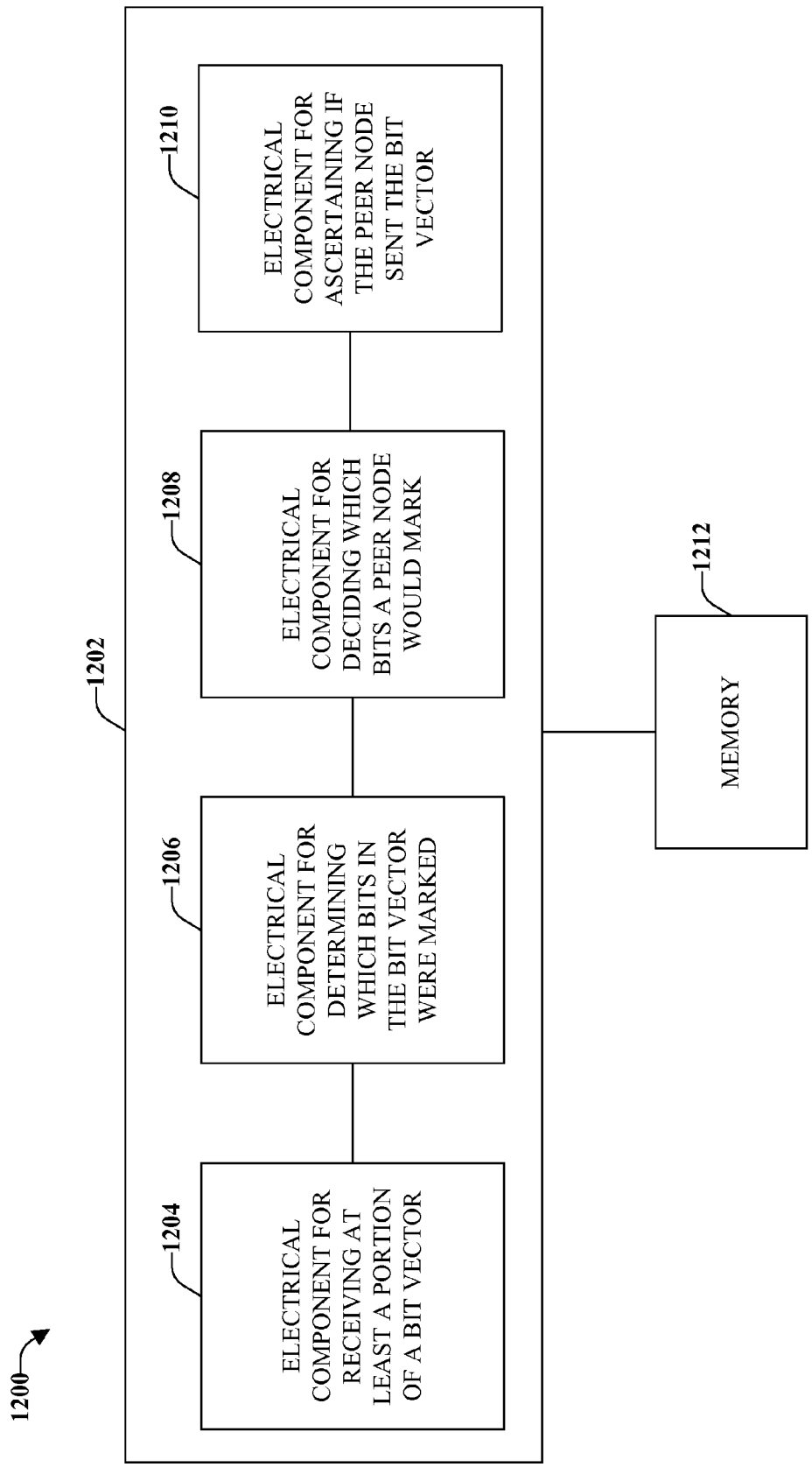
FIG. 12 illustrates an example system that receives a key and derives a public identifier based in part on the received key.

With reference to FIG. 12, illustrated is an example system 1200 that receives and interprets a sub-portion of a bit vector to facilitate peer discovery in an ad hoc environment. System 1200 may reside at least partially within a mobile device. It is to be appreciated that system 1200 is represented as including functional blocks, which may be functional blocks that represent functions implemented by a processor, software, or combination thereof (e.g. firmware).

System 1200 includes a logical grouping 1202 of electrical components that can act separately or in conjunction. Logical grouping 1202 can include an electrical component for receiving at least a portion of a bit vector from a transmitting node 1204. Further, logical grouping 1202 can comprise an electrical component for determining which bits in the received portion of the bit vector are marked 1206. The marking can be established by determining that the bit is set to "1". Moreover, logical grouping 1202 can include an electrical component for deciding which bits a peer node would mark in the bit vector 1208. The bits, which would be marked, can be based on one or more known identifiers associated with the peer device, even if the peer node also used other, unknown identifiers to mark the bits in the bit vector. Logical grouping 1202 can also include an electrical component for ascertaining if the peer node could have sent the bit vector 1210. The determination if the peer node sent the bit vector can be made based on the determination of the bits marked in the received portion of the bit vector.

Additionally or alternatively, logical grouping 1202 can include an electrical component for ignoring the received portion of the bit vector if a number of bits marked exceed an upper limit. If the marked bits exceed the upper limit, it can indicate a device that is malicious, malfunctioning, or is sending communications that cannot be trusted. Also included can be an electrical component for selectively initiating communication with the transmitting node if the portion of the bit vector might have been received from the peer node. The communication might be a request for verification whether or not the transmitting node is the peer node.

Additionally, system 1200 may include a memory 1212 that retains instructions for executing functions associated with electrical components 1204, 1206, 1208 and 1210. While shown as being external to memory 1212, it is to be understood that one or more of electrical components 1204, 1206, 1208 and 1210 may exist within memory 1212.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3 GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3 GPP). Additionally, cdma2000 and UMB are described in documents from an organization named "3rd Generation Partnership Project 2" (3 GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for creating a sequence of bits that represent two or more identifiers for broadcast during peer discovery for peer-to-peer communication, comprising:
    selecting two or more identifiers to be different than each other, wherein each of the two or more identifiers identify a single transmitting device in a network;
    processing the selected identifiers to produce a sequence of bits included in a bit vector, wherein a set of marked bits in the sequence of bits include a subset of overlapping bits each marked by the two or more identifiers, and wherein an upper bound indicates a maximum number of bits that are allowed to be marked; and
    broadcasting the bit vector from the single transmitting device to a plurality of devices of the network enabling each of the plurality of devices to receive the bit vector to identify the transmitting device with a respective one of the two or more identifiers,
    wherein the broadcast bit vector is ignored by the plurality of devices when a number of marked bits in the broadcast bit vector is larger than the upper bound.

2. The method of claim 1, wherein the two or more identifiers relate to a user, a service, a function, an interest, or combinations thereof.

3. The method of claim 1, wherein the two or more identifiers are automatically selected, manually selected, or combinations thereof.

4. The method of claim 1, wherein the two or more identifiers are automatically selected based on a usage frequency, a primary indication, a current use, or combinations thereof.

5. The method of claim 1, wherein at least one of the two or more identifiers is a private temporary identifier.

6. The method of claim 1, wherein processing the selected identifiers includes performing a hash operation or multiple hash operations on the selected identifiers.

7. The method of claim 1, further comprising setting the upper bound.

8. A wireless transmitting device, comprising:
a memory that retains instructions related to:
choosing two or more identifiers, wherein each of the two or more identifiers identify the wireless transmitting device in a network, for broadcast during peer discovery for peer-to-peer communication, the two or more identifiers being different than each other;
processing the two or more identifiers through a filtering mechanism to produce a bit vector corresponding to the two or more identifiers, wherein the bit vector comprises a sequence of bits, wherein a set of marked bits in the sequence of bits include a subset of overlapping bits each marked by the two or more identifiers, and wherein an upper bound indicates a maximum number of bits that are allowed to be marked, and
broadcasting the bit vector from the wireless transmitting device a plurality of devices of the network enabling each of the plurality of devices to receive the bit vector to identify the wireless transmitting device with a respective one of the two or more identifiers,
wherein the broadcast bit vector is ignored by the plurality of devices when a number of marked bits in the broadcast bit vector is larger than the upper bound; and
a processor, coupled to the memory, configured to execute the instructions retained in the memory.

9. The wireless transmitting device of claim 8, wherein the memory further retains instructions related to converting a public identifier into a temporary private identifier.

10. The wireless transmitting device of claim 8, wherein the bit vector is broadcasted as part of a peer discovery process.

11. The wireless transmitting device of claim 8, wherein the two or more identifiers relate to a user identification, a service, a function, an interest, or combinations thereof.

12. The wireless transmitting device of claim 8, wherein the filtering mechanism is a hash operation or multiple hash operations.

13. The wireless transmitting device of claim 8, wherein the memory further retains instructions related to setting the upper bound and removing at least one identifier from the bit vector if the number of marked bits meets or exceeds the upper bound.

14. A wireless transmitting device that broadcasts at least two identifiers using a bit sequence to facilitate peer discovery while mitigating the amount of overhead in a communication environment, comprising:
means for selecting two or more identifiers to be different than each other, wherein each of the two or more identifiers identify the wireless transmitting device in a network;
means for processing the selected identifiers to produce an output bit sequence that comprises a set of marked bits, wherein the set of marked bits include a subset of overlapping bits each marked by the two or more identifiers, and wherein an upper bound indicates a maximum number of bits that are allowed to be marked; and
means for broadcasting the output bit sequence from the wireless transmitting device to a plurality of devices of the network enabling each of the plurality of devices to receive the bit vector to identify the wireless transmitting device with a respective one of the two or more identifiers, wherein the output bit sequence is ignored by the plurality of devices when a number of marked bits in the output bit sequence is larger than the upper bound.

15. The wireless transmitting device of claim 14, further comprising means for selecting the upper bound.

16. A computer program product, comprising a non-transitory computer-readable medium, comprising:
a first set of codes for causing a computer to choose two or more identifiers, wherein each of the two or more identifiers identifies the computer in a network, the two or more identifiers being different than each other;
a second set of codes for causing the computer to perform an operation on the chosen identifiers to produce a plurality of marked bits within a bit vector, wherein the plurality of marked bits correspond to the two or more identifiers, the marked bits include a subset of overlapping bits each marked by the two or more identifiers, and an upper bound indicates a maximum number of bits that are allowed to be marked; and
a third set of codes for causing the computer to broadcast the bit vector with the marked bits for peer discovery by a plurality of devices of the network enabling each of the plurality of devices to receive the bit vector to identify the computer with a respective one of the two or more identifiers, wherein the broadcast bit vector is ignored by the plurality of devices when a number of marked bits in the broadcast bit vector is larger than the upper bound.

17. The computer program product of claim 16, wherein the operation is a hash operation or multiple hash operations.

18. The computer program product of claim 16, the computer-readable medium further comprises:
a fourth set of codes for causing the computer to select the upper bound.

19. The computer program product of claim 16, the computer-readable medium further comprises:
a fourth set of codes for causing the computer to change a publicly known identifier to a temporary private identifier; and
a fifth set of codes for causing the computer to use the temporary private identifier as at least one of the two or more chosen identifiers.

20. At least one processor configured to create a bit vector that represent two or more identifiers for broadcast during a peer discovery process, comprising:
a first module for selecting two or more identifiers to be different than each other, wherein each of the two or more identifiers identify a single transmitting device in a network;
a second module for converting at least one of the two or more identifiers to a private temporary identifier;
a third module for setting an upper bound that indicates a maximum number of marked bits that can be included in a bit vector, wherein the marked bits include a subset of overlapping bits each marked by the two or more identifiers;
a fourth module for processing the selected identifiers and the private temporary identifier through a hash algorithm to produce a sequence of marked bits within the bit vector, wherein the sequence of marked bits complies with the set upper bound; and
a fifth module for broadcasting the bit vector from the single transmitting device to a plurality of devices of the network enabling each of the plurality of devices to receive the bit vector to identify the transmitting device with a respective one of the two or more identifiers, wherein the broadcast bit vector is ignored by the plurality of devices when a number of marked bits in the broadcast bit vector is larger than the upper bound.

* * * * *